July 28, 1936.  S. SHINGLETON  2,049,086

CABLE REEL FOR BLASTING MINES

Filed July 16, 1934

Inventor:
S. Shingleton
By Glascock
Downing & Seebold
Attorneys.

Patented July 28, 1936

2,049,086

UNITED STATES PATENT OFFICE 2,049,086

CABLE REEL FOR BLASTING MINES

Sanford Shingleton, Edgemont-Fairmont, W. Va.

Application July 16, 1934, Serial No. 735,475

4 Claims. (Cl. 200—59)

This invention relates to a reel, particularly adapted for use in connection with electric wires used in blasting coal and other material, my particular object being a production of a reel of this character that will conduce to safety and convenience in handling.

Another object of the invention is to provide a reel that may be held in a frame and be easily detached or assembled when desirable.

With these objects in view, which will be developed as the description proceeds, I will now describe my invention in connection with the attached drawing in which:—

Figure 4:
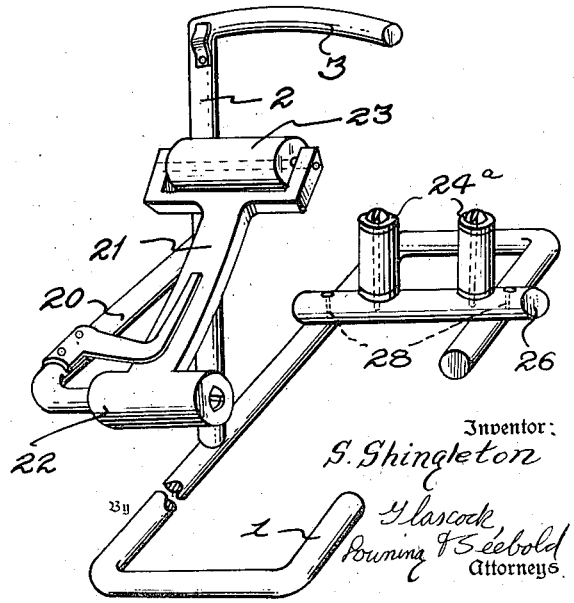
Figure 4 is a view of the frame and guide rollers with the reel detached therefrom.

1 is the base of a reel frame. This frame may be conveniently shaped, as shown best in Figure 4, having a base portion formed by bending over the ends of the rod or wire 1 and extending up from the base 1 is a standard 2 terminating at its top end preferably in a handle 3. It is apparent that when the frame is set upon the ground or a horizontal support, as shown in Figure 4, it will maintain the standard 2 in an upright position for the support of the reel.

The reel portion may conveniently consist of a cylindrical portion 5 and end portions 6 and 7. I preferably bevel the end portions 6 and 7 as shown at 8, 9 to direct the electric wiring 10 on to the reel cylinder 5.

Through the center of the cylinder 5 and end portions 6 and 7 I provide a hollow shaft 11', preferably split at its ends 11—12 to receive a pin 13 carried by a solid rod 14. This solid rod fits loosely within the hollow rod or sleeve 10 and the rod 14 may be screw threaded at its ends, as shown at 16, for the reception of a nut 17. The other end of the solid rod 14 carries the pin 13 in the slot for the split portions 11—12 of the sleeve 11'.

Figure 2:
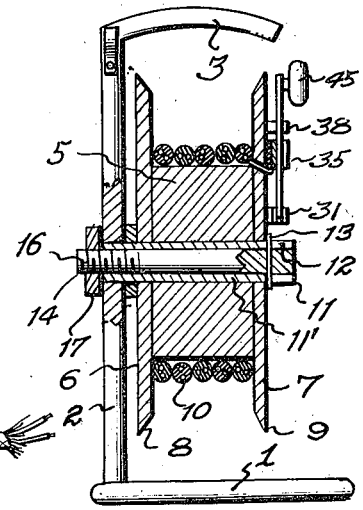
Figure 2 is a sectional view of the reel and frame at right angles to Figure 1 and taken upon plane 2—2 of Figure 3.

It is apparent from this construction that if the reel and the end portions 6 and 7 be mounted on the sleeve portion 11', as shown in Figure 2, the solid rod 14 may be slipped through the sleeve portion 11'. The pin 13 will pass into the slot portion 11—12 and when the nut 17 is screwed up the pin 13 will be brought against the end portion 7 and clamp the reel friction-tight to the standard 2.

Figure 1:
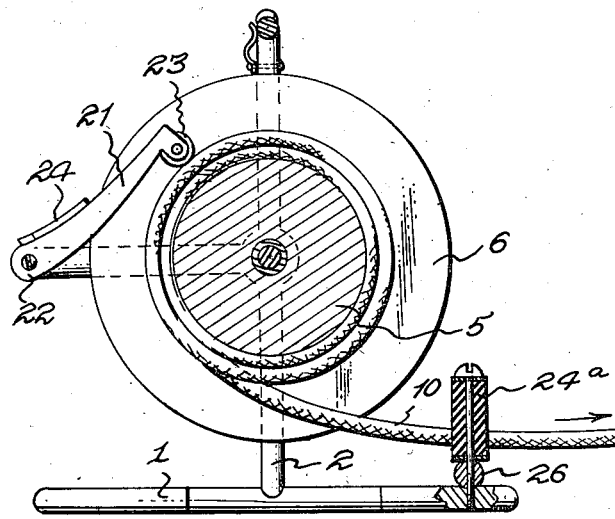
Figure 1 is a part sectional view of a reel and a view of its supporting frame.

Extending from the standard 2, I may provide an arm 20 having a second arm 21 pivoted thereon at 22, said arm 21 having at its end a roller 23 to bear upon the reel 5 to produce friction enough to prevent the reel from unwindinig too readily. A spring 24 mounted on the arm 20 may be arranged in well known manner to hold the arm 21 and the roller 23 in the position shown in Figure 1.

I preferably provide rollers 24a to guide the electric wire 10 as it is being rolled up on the reel. These rollers may conveniently be held by a rod 26 fastened as by pins 28.

Figure 3:
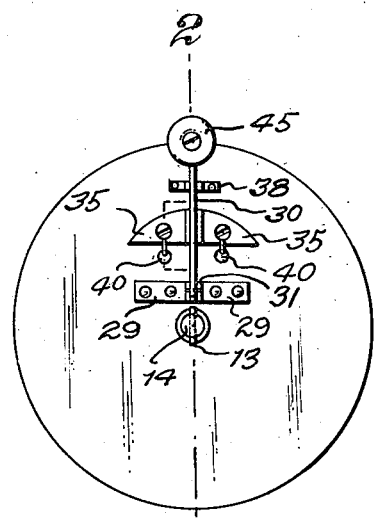
Figure 3 is an end view of the reel showing a handle and switch used in connection with the apparatus.

Attached to one end of the reel are brackets 29—29 spaced apart at their inner ends to receive a handle 30 pivoted at 31 between said brackets 29—29. Above the brackets, as shown best in Figure 3, are terminals 35—35, the terminals terminating in upturned ends between which the lever or handle 30 may fit closely and to guide the handle 30 between the upturned ends of the terminals 35—35 I may provide a second set of guide brackets 38—38. The end portion 7 may be provided with holes 40—40 through which the electric wires may pass and be attached in electric contacts with the terminals 35—35 by screws, as shown best in Figure 3. The handle 30 may terminate in a knob 45 for convenience in winding up the wire on the reel.

To those skilled in this art, it is apparent that when the handle 30 is in place, as shown in Figs. 2 or 3, for winding up the cable 10 with the wire terminals grounded at 35, the cable is safe. It cannot be fired while the handle 30 is in this position.

When the handle 30 is pulled out from between 35—35 a mine at the other end of cable 10 is ready to be fired by placing terminals of a battery (not shown) to terminals 35—35. Moreover, it is apparent that the reel cannot be readily wound up until the handle 30 is in position between the terminals 35—35 and brackets 38—38, as shown in Figs. 2 or 3, thus grounding the cable at 35—35 and making it safe again. When the handle 30 is out of position the leverage at the pivot 31 for winding the reel is so small as to render winding practically impossible.

The rollers 24a will guide the wire 10 to the reel 5 while the feet of the frame will hold the reel in the upright position shown in Figure 2.

When it is desired to detach the reel from the frame, the nut 17 may be removed from the rod 14 and the rod 14 carrying the pin 13 removed through the slot in the end of the sleeve 11' when all the parts may be separated.

It is also apparent that by screwing up the nut 17 the pin may be brought against the end portion 7 to frictionally hold the reel in one position on the frame.

Having now described my invention, what I claim as new is:—

1. A device of the class described, comprising a frame, a reel, a pivot for attaching the reel to the frame, the reel having an end portion with two terminals thereon, electric wires on the reel in contact with the terminals and a handle pivotally mounted to an end of the reel for reeling the same and adapted to electrically connect the terminals when inserted therebetween.

2. A device of the character described, comprising a reel having a central electric wire reeling portion and an end portion, a frame on which the reel is pivoted, a handle pivoted to the outer end portion of the reel for winding same, electric terminals on the end portion of the reel and between which said handle may be thrust to form an electrical contact between the terminals and electric wires attached to said terminals.

3. A device of the character described, comprising a central electric wire take-up portion having opposite ends larger in diameter than the central wire take-up portion, one of the ends having pivoted thereon a lever having a handle thereon for turning the electric wire take-up portion for manipulating the wires on the central take-up portion, terminals on the end portion between which said handle may be thrust, said terminals being electrically connectible to the electric wires.

4. A device of the character described, comprising a frame, a reel pivoted to said frame, said reel having an end portion with two terminals thereon, electric wires on the reel connected to said terminals, a single movable means mounted on the reel for winding said reel, said means adapted to electrically connect said terminals when said means is in the reel winding position and to electrically disconnect said terminals when moved away from the reel winding position.

SANFORD SHINGLETON.